United States Patent [19]

Levy et al.

[11] Patent Number: 4,860,475
[45] Date of Patent: Aug. 29, 1989

[54] FIBER OPTIC PICTORIAL DISPLAY KIT

[76] Inventors: Zubin Levy, Box 717, Ojai, Calif. 93023; Gerry E. Swemer, 4699 S. Valley View Blvd., Las Vegas, Nev. 89103

[21] Appl. No.: 81,449

[22] Filed: Aug. 4, 1987

[51] Int. Cl.⁴ ............................................. G09F 13/00
[52] U.S. Cl. ....................................... 40/547; 40/452
[58] Field of Search ................. 40/547, 452, 433, 435; 350/96.20

[56] References Cited

U.S. PATENT DOCUMENTS

| | | | |
|---|---|---|---|
| 1,845,530 | 2/1932 | Tarallo | 40/547 |
| 2,507,909 | 5/1950 | Kaysen | 40/547 |
| 2,639,528 | 5/1953 | Ochsner | 40/547 |
| 3,184,872 | 5/1965 | Way | 40/547 |
| 4,113,347 | 9/1978 | Gaertner | 40/452 |
| 4,196,539 | 4/1980 | Speers | 40/547 |
| 4,279,089 | 7/1981 | Murakami | 40/547 |
| 4,504,830 | 3/1985 | Boechme | 40/547 |

Primary Examiner—Robert P. Swiatek
Assistant Examiner—Cary E. Stone
Attorney, Agent, or Firm—Dowell & Dowell

[57] ABSTRACT

An educational kit for teaching and developing creative arts which includes changeable panel displays or pictures whihc are selectively light accented and animated using a plurality of optical fibers which are mounted within a frame or housing and which have free ends that may be specifically or randomly mounted within openings created in the panel display or picture so as to create a variety of changeable and visually perceived light forms or patterns and wherein the optical fibers have fixed ends which receive light emitted from a source which is also mounted within the frame.

12 Claims, 3 Drawing Sheets

U.S. Patent  Aug. 29, 1989  Sheet 1 of 3  4,860,475
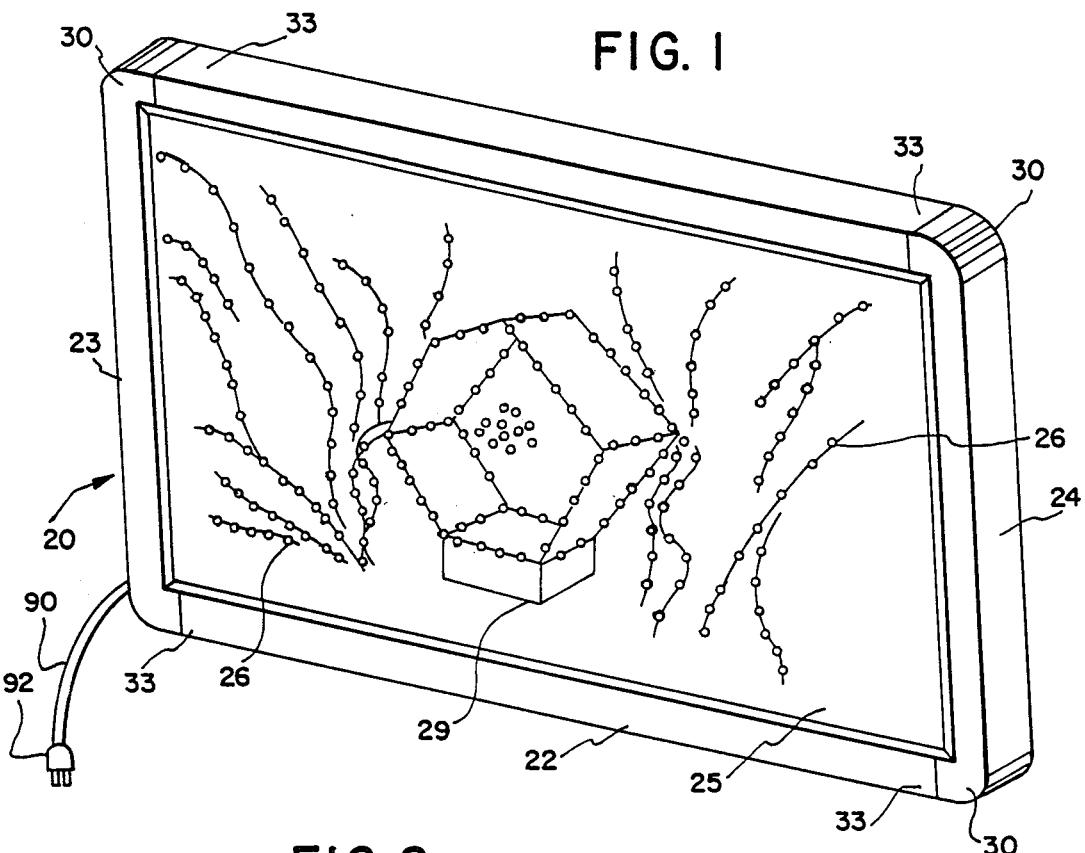
FIG. 1
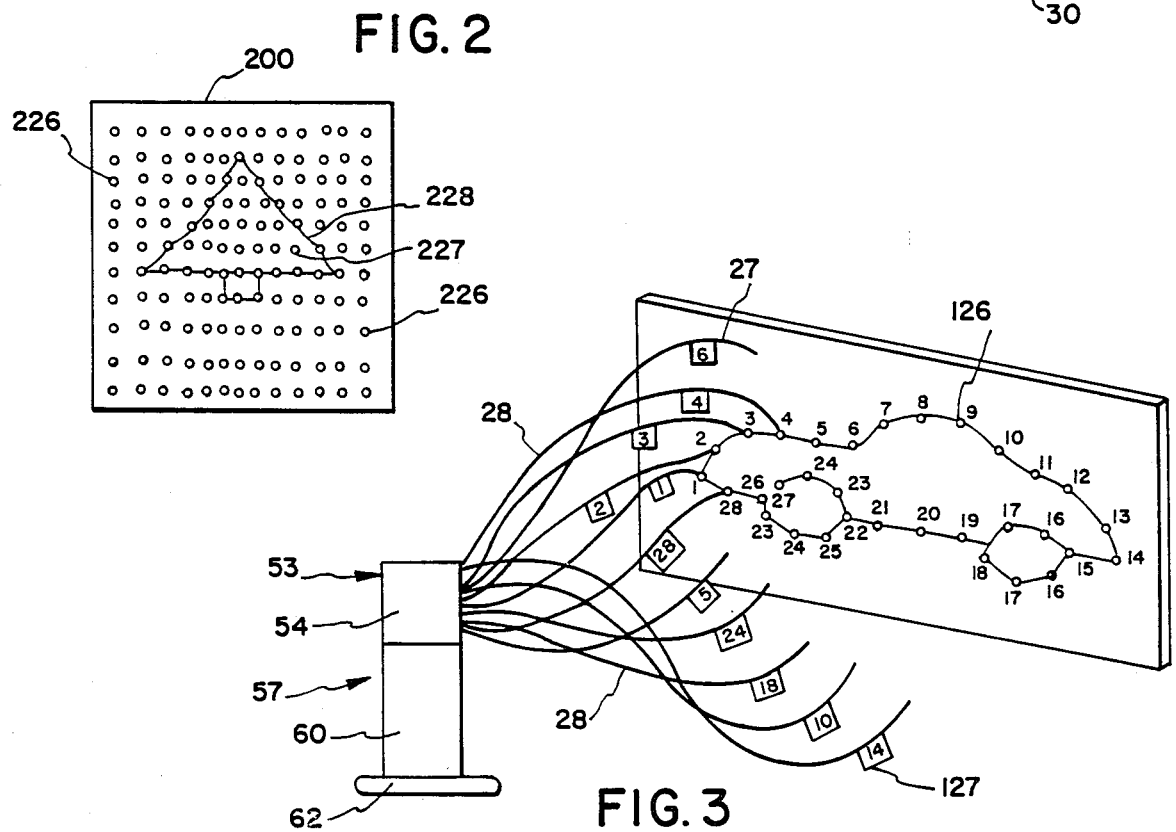
FIG. 2
FIG. 3

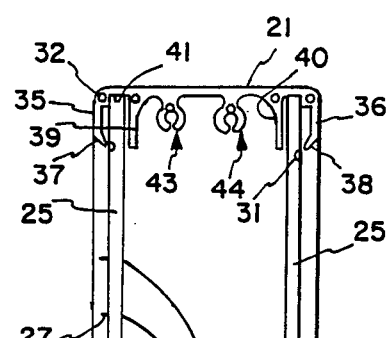
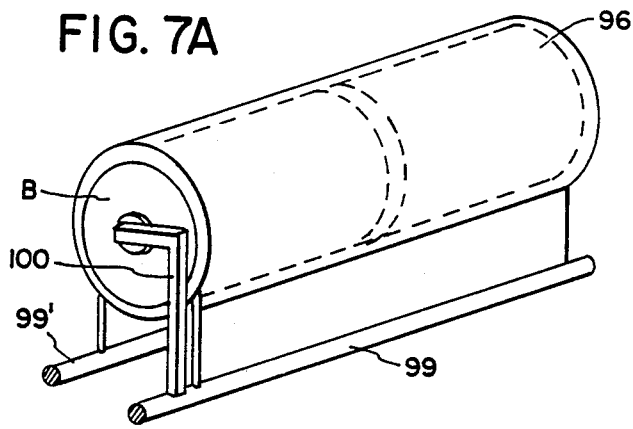
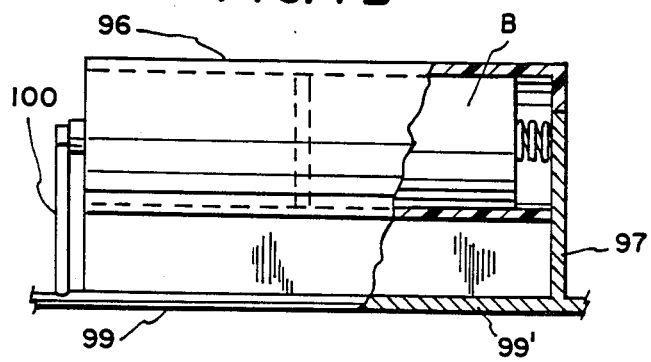
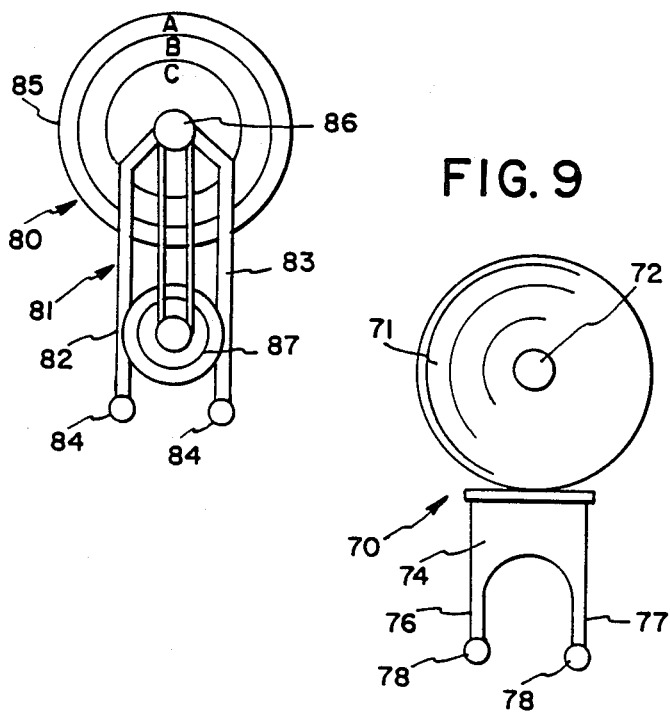
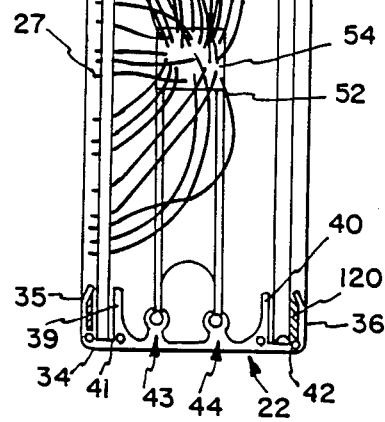

FIBER OPTIC PICTORIAL DISPLAY KIT

BACKGROUND OF THE INVENTION

1. Field of the Invention

This invention is generally directed to fiber optic display devices and more specifically to fiber optic display kits which may be utilized to create either preconceived and predesignated pictorial light displays or individually and randomly created light displays wherein the kit includes one or more display panels, screens or pictures having a plurality of openings therein through which the free ends of a plurality of optical fibers may be extended so as to create a plurality of points of spaced lights in the display panel. In the preferred embodiment, it is envisioned that the optical fibers will be mounted so that their fixed ends receive varying patterns of colored light from a light source by way of one or more color wheels which are associated with the kit. The kits include a frame work in which bundles of fiber optics are mounted so as to be selectively spaced to receive light emitted from the light source which is also mounted within the frame. The frame may be utilized as a conventional picture frame so that a completed display panel may be hung on a wall or other surface.

The kits are designed not only to allow the creation of lighted pictorial displays or art forms but also to permit the creation of animated displays through the use of changing light patterns which are emitted through the free ends of the optical fibers. In addition, the kits are designed to be of particular interest to younger children to both teach and develop motor control in the use, handling and placement of the optical fibers with respect to the pictorial display and also to developing instructional response by requiring that specific patterns be created by identifying specific openings in the display with predesignated optical fibers so that preconceived displays may be created by properly following instructions which match specific openings designated by numbers or colors with specific optical fibers. The kit also permits the expression of personal or individual artistic attitudes and feelings by permitting children or other persons to randomly create their own light patterns and animated or changing light displays utilizing the panels provided with each kit.

2. History of the Related Art

Limited use has been made of fiber optic materials to create visual displays. The use of optical fibers allows light from a common source to be transmitted to remote and spaced locations where the light may be emitted as either a point or line of illumination. Because of the unique capability of optical fibers to transmit light, it is possible to create displays of light without having to provide a lamp or other light source at the point of display. Fiber optics have been utilized to create a variety of visual and ornamental displays which may take a sculptured or three dimensional form or may appear as points or lines of light along a viewing surface or screen.

Many prior art fiber optic displays are particularly designed to create a floral or free form display of light using fibers which extend upwardly with respect to a base wherein a light source is housed. Light from the source is channeled through the optical fibers with the tips of the fibers being brightly illuminated creating the illusion of suspended point sources of light. Such displays may be varied in shape and pattern and may also include changeable colors or patterns which make the overall fiber optic display appear to be animated. By providing a rotating disk between the light source and the adjacent ends of the optical fibers, the light directed to the optical fibers may be interrupted to create various sequential patterns and timing of light emissions from the free or remote ends of the fibers. By placing color wheels intermediate the source of light and the receiving end of the optical fibers, it is also possible to change the color which is emanated from the free ends of the fibers. Some examples of prior art fiber optic three dimensional displays are disclosed in U.S. Pat. Nos. 3,431,410 to Dolan et al., 3,536,908 to Oster and 4,907,917 and 4,206,495 to McCaslin.

Other types of fiber optic displays are in the form of backlighting displays or signs used in business and commercial establishments. Utilizing fiber optics, it is possible to create business signs which are more economical to operate and which can be utilized to create movable patterns such as those traditionally utilized with neon displays. Using fiber optics, it is possible to transmit light from a remote relatively low cost source of light to the signs' exterior where various patterns of light may be displayed. Again, through the use of color wheels and with the aid of computer controls, it is possible to regulate the lighting of the optical fibers so as to create patterns of lights and colors that effectively set off the sign thereby increasing the advertising utility of the sign and more effectively promoting the business to which the sign relates.

In a similar manner, fiber optic light displays are used in commercial establishments to create backlighting such as a starlit sky backdrop for a ceiling wherein the optical fibers have different light intensities which simulate the sky at night. Again, utilizing computer controlled light sources, it is possible to create movement of light patterns so as to create shooting stars, comets and the like by effectively transmitting the light from one optical fiber to another in a series or sequence which is regulated by proper programming.

In other types of fiber optic displays, movable light patterns have been created in enclosures wherein the light patterns appear to be point sources of light suspended in space within the confinement of the enclosures. By utilizing various filters and screens, it is possible to create moving light displays in what appears as a relatively void environment. An example of such a fiber optic display is disclosed in U.S. Pat. No. 4,280,122 to McKinley et al.

In addition to point source fiber optical displays, it is also possible to utilize edge lighted acrylic or glass fiber optic displays. Edge lighted fiber optics are powered by higher intensity sources of illumination and create light effects where the edges of the optical fibers are viewed as opposed to the ends thereof. With such types of fiber optics, it is possible to create continuous light patterns. Edge lighted fiber optics are also found in commercial environments for creating signs or backlighting and have also found use and utility in creating visual displays which may be constructed or formed into various geometrical patterns or displays. In U.S. Pat. No. 4,519,017 to Daniel, a light emitting optical fiber assembly is disclosed wherein panels employ or support nonwoven geometrical grids of light emitting optical fibers which are arranged in various patterns. With such displays, the light emitting optical fibers are stretched on relatively rigid frames with the total geometrical pattern being displayed by the light emitting edge portions of the optical fibers. Some additional examples of edge lighted optical fibers are disclosed in U.S. Pat. Nos. 4,172,631 to Yeveck and 4,234,907 to Daniel.

Although the prior art acknowledges that fiber optics may be utilized to create visual displays and displays which create animated effects, the prior art use of fiber optics has been limited to fixed or preformed displays which are made available to the consumer as completed units wherein the sole benefit of the displays or units are their unique light emitting features. Generally, the prior art has not recognized the advantages which could be achieved by allowing fiber optics to be utilized by individuals to promote their own artistic expressions by enabling the individual to design and create their own lighted patterns and displays. In addition, the use of a media which creates immediate visual effects could be useful as a teaching tool to enable people, especially young children, to be expressive through the creation of varied or predesignated light forms, patterns and the like.

Prior art optical displays have been overly complicated and not suitable for use to permit individuals to create their own visual displays utilizing basic fiber optic materials including optical fibers, light sources, color wheels, light regulating masks or disks and the like.

SUMMARY OF THE INVENTION

This invention is directed to an educational kit for teaching and developing the creative arts wherein each kit includes a frame or housing in which one or more changeable panels, pictures or screens are selectively mounted and wherein the frame provides support for one or more bundles of optical fibers which may be illuminated by a light source also mounted within the frame or housing. The kits further include one or more color filters which are preferably in the form of color wheels which are adjustably mounted with respect to the fiber optic bundles and the light source. Various opaque or translucent masks may also be incorporated with the kit so as to regulate light intensity to any given number of optical fibers and thereby further alter the visual display which is possible utilizing the kit. The panels, pictures or screens which are interchangeably mounted to the frame include a plurality of openings therein through which individual ends of the optical fibers from the fiber optic bundles may be selectively inserted so that the free ends of each fiber extend outwardly of the panels, screens or pictures. In some embodiments of the invention, scenes may be applied to the panels or screens so that the free ends of each optical fiber are utilized to accent the pictorial representation incorporated with each screen. In other embodiments of the invention, the openings in the panels or screens may be predesignated by codes, colors or numbers which are applied to the back of the panels. Each of the optical fibers or groups of the fibers may also be coded by being tagged or having a preapplied identification incorporated therewith so that specific light patterns and displays may be created by following sets of instructions which designate which optical fibers are to be inserted within specific openings.

In other embodiments of the invention, the panels or screens may have a plurality of generally equally spaced openings formed throughout the surface thereof so that an individual may selectively create their own design and their own visual display by selectively choosing particular optical fibers which are to be inserted through each opening. In this embodiment, the individual is challenged to use their own imagination in developing an artistic and animated light form that can also be utilized to supplement or highlight other art work which may be selectively applied to the surface of the screen such as by drawing a picture thereon. This enables the individual to further accent their own artistic work creating a more dynamic and more animated art form.

According to the preferred embodiment of the invention, the housing or frame for the kit includes a plurality of interlocking channel members which define the perimeter of the frame and which are joined at their ends so as to create a substantially enclosed area in which the screens or panels are selectively mounted. Each channel member includes a pair of forwardly oriented and spaced continuous flange members which provide a recess or continuous groove for receiving the panels or screens therein. The frame is designed so that one of the end channels may be selectively moved or separated by a snap engaging action from the remaining channels to thereby permit a panel member or display screen to be slidingly inserted between the mounting flanges of the remaining channels. In some embodiments, the rear portion of the housing may also support a removable display panel so that the housing may be utilized to simultaneously support opposing display panels. In this embodiment, panel mounting flanges will be provided on each side of the frames.

The channel members also include a pair of elongated mounting or guide rails which are utilized to slidingly receive a fiber optic module having a fiber optic matrix mounted thereto so as to be in elevated or spaced relationship with respect to the channel. The fiber optic component or module includes a pair of depending leg portions which are slideably carried in the guide rails formed in the channels of the frame. One or more such fiber optic components may be provided with each kit. The light source, color wheel and any masking components are likewise mounted on depending bifurcated bases which are engageable within the guide rails and are slideable with respect thereto so that the light sources, color wheels and masks may be selectively adjustably oriented with respect to the fiber optic modules. The mounting rails will insure that the components are exactly aligned so that the light being directed through any filtering or wave length altering media will still be directly in line with the receiving end portions of each of the optical fibers. Power may be supplied to the light source and movable color wheels or any other motor attachments by providing elongated electrical contacts in the base of each of the rails associated with the frame members. The elongated contacts will be connected to an electrical power source which should preferably take the form of a low voltage DC power source such as a battery or an AC-DC converter connected to a suitable AC power source.

It is the primary object of the present invention to provide an educational toy or kit for use by individuals wherein a plurality of varying fiber optic displays may be selectively created by the selective and individual insertion of optical fibers through openings in a display panel or board wherein the display panel or board may also incorporate pictorial scenes which will become accented and highlighted by the light emitted by the optical fibers which are incorporated therewith.

It is yet another object of the present invention to create an optical display kit which may be utilized to construct or create predesignated visual effects which are associated with a display panel wherein the movement of light through optical fibers and the variation and color and sequencing may be understood by coordinating the placement of individual optical fibers with predesignated positions within a matrix or support panel provided with the kit.

It is another object of the present invention to provide an educational kit which can be utilized to enhance a child's interest and creativity by permitting a child to manipulate and alter visual light sources with respect to a background pictorial display to thereby achieve different patterns which are expressive of feelings and emotion and the individuality of the child.

It is a further object of the present invention to provide an educational fiber optic display kit which can be assembled by the consumer so as to create light accented and highlighted pictorial displays which may be mounted on a wall or other surface as an artistic creation having light animated characteristics which have an effect not only on the way in which the artistic work is viewed but also to create an aura of movement and depth which is not achieved by a simple pictorial display alone. The use of colors and moving color combinations in incorporation with a pictorial display can be effectively utilized to create and stimulate beneficial mood changes and heighten interest with respect to the overall artistic display.

It is yet another object of the present invention to provide a toy or kit which may be assembled by children and which utilizes a plurality of optical fibers which may be specifically placed or selectively placed in a support matrix so as to create various light patterns which may be used alone or in combination with a pictorial display applied to the matrix or panel and wherein the individual placement of the optical fibers with respect to the matrix can be utilized to develop interest in the subject matter of the matrix such as in highlighting areas of a map to indicate state capitals, movements of constellations with respect to the night skies, transportation and airline routings relative to various geographical areas, the flow of rivers and streams relative to geographical areas or other educational concepts.

It is also an object of the present invention to provide a kit which can be utilized to not only stimulate a child's interest with respect to various artistic or pictorial displays but which requires specific hand movements and fiber manipulation to be accomplished thereby stimulating not only motor control but encouraging, in some instances, the following of instructions to match specific optical fibers with specific openings in a display panel or matrix so as to create a predesigned display or which, in the alternative, may permit individuality and creativity to be exhibited by allowing the child to create their own light display which may be selectively altered as to color or animation by uses of various color wheels and/or masks used to effect the light projected on the optical fibers.

A further object of the present invention is to provide a fiber optic display kit which may be utilized and is safe for use by children and which permits children to experiment with fiber optic displays to create highlighted visual scenes or to create animated scenes by the selective creation of movable light patterns with respect to a matrix or support panel provided with the kit.

Another object of the present invention is to provide a kit for permitting various fiber optic light displays to be individually created or formed by children wherein all the components of the kit are safely locked and guided in continuous channels which are provided with the frame of the kit and which insure that the components including light source, color wheels, masking wheels and fiber optic bundles are properly aligned and safely oriented with respect to the matrix support panels through which the optical fibers are mounted so that there is no danger of the components being damaged or misaligned during use.

It is also an object of the present invention to provide a kit which can be utilized to create light accented artistic displays and scenes which may be mounted as conventional pictures upon a wall but which when powered through an AC or DC power source will create various visual effects including animation of the various light forms thereby creating further sensory stimulus for the individual viewing the artistic work or working with and creating the artistic work.

BRIEF DESCRIPTION OF THE DRAWINGS

FIG. 1 is a perspective illustrational view of one embodiment of the present invention as it is assembled to form a lighted pictorial display.

FIG. 2 is a front elevational view of a modified matrix or display panel which can be utilized with the kit of the present invention.

FIG. 3 is a partial assembly view showing a fiber optic module having predesignated optical fibers which are aligned for insertion with coded openings or marked openings in a display panel of the present invention.

FIG. 5 is an enlarged cross sectional view taken along lines 5—5 of FIG. 1.

FIG. 7A is a perspective view of the battery pack assembly of the present invention.

FIG. 7B is a side view having portions broken away of the battery pack assembly of FIG. 7A.

FIG. 8 is a front elevational view of the color wheel module of the present invention.

FIG. 9 is a front elevational view of the light source module of the present invention.

DESCRIPTION OF THE PREFERRED EMBODIMENT

Figure 4:
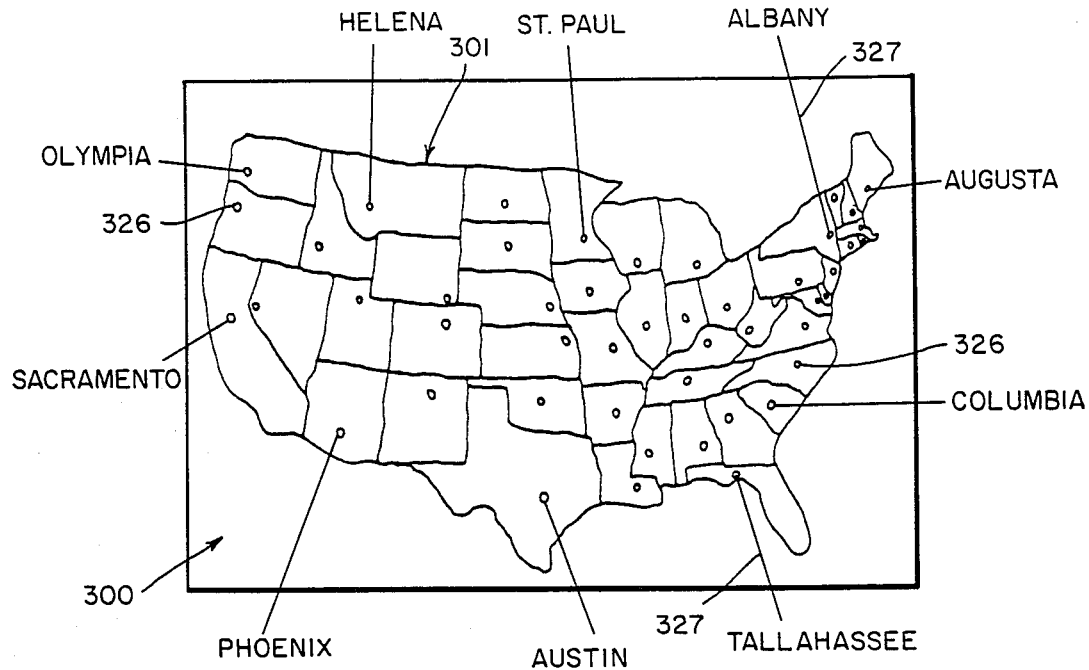
FIG. 4 is a front elevational view of another modified educational teaching panel or matrix which may be utilized with the display kit of the present invention.

With continued reference to the drawings, the fiber optic display kit of the present invention is generally shown as including a frame 20 having top and bottom sections 21 and 22 and opposing side sections 23 and 24. A panel, picture or screen member 25 is selectively mounted on the forward portion of the frame with the rear portion of the frame either being selectively closed by a continuous wall (not shown) or by providing a mounting surface for a second panel, picture or screen 25' as reflected in FIG. 5 of the drawings. Each panel, picture or screen member 25 will have a plurality of openings 26 made therethrough through which the outer free ends 27 of a plurality of optical fibers 28 may be selectively extended. A picture, design or other indicia 29 is preferably provided or formed along the outer surface of each panel or screen member with the openings 26 therein coinciding with areas to be accented or highlighted by the use of light emitted from the ends of the optical fibers.

It is envisioned that the frame or housing for the panel or screen members may take any of a number of configurations. As shown in the drawings, the frame member provides a generally rectangular housing although circular, oval or multi-sided configurations may be utilized as desired. In a like manner, the panels or screens will be correspondingly shaped to be cooperatively seated and retained with respect to the frame member and therefore may take shapes other than the rectangular shape shown in the drawings.

In the preferred embodiment of the invention, the frame members are formed of an extruded plastic material with the top, bottom and side sections being frictionally interlocked with respect to one another to form a continuous outer surface. The side sections are shown as having curved end portions 30 which have a plurality of outwardly extending male connector pins (not shown) extending therefrom and which are in alignment with holes or openings 32 provided in each end portion 33 of the top and bottom sections. The pins are of a size to be frictionally received in the holes 32 to thereby snap the frame components into interlocking engagement with respect to one another.

The frame sections are generally formed with similar cross sections and include a generally planar outer wall 34 which is integrally formed with a pair of outer flanges 35 and 36 both of which have inwardly tapering forward end portions 37 and 38. The inwardly tapering end portions of each of the outer flanges 35 and 36 are resilient and are utilized to compress a panel member against inwardly formed generally linear flanges 39 and 40 which are spaced relative to the outer flanges 35 and 36 in order to form elongated channels 41 and 42 in which the edge portions of the panel members may be selectively and slidingly received. In some embodiments of the invention, and as shown in FIG. 5, the tapered ends 37 and 38 of the side flanges 35 and 36 may be cooperatively seated in elongated grooves 31 which are formed in the panel member so as to thereby provide a positive locking engagement to secure the panels in assembled relationship with respect to the frame members.

Each of the frame sections further includes a pair of component mounting rails 43 and 44 which extend inwardly in generally equally spaced relationship between the inner flanges 39 and 40. The mounting rails 43 and 44 include neck portions 45 and 46 from which opposing bifurcated leg elements 46 and 47 are extended. An elongated gap or opening is formed between each of the opposing leg portions of each rail. Due to the plastic construction of the rail members, the leg portions thereof may be flexed outwardly with respect to one another so as to permit the elongated openings therein to be widened in order to selectively receive components which will be mounted therein as will be hereinafter described in greater detail. In order to provide a source of power along each of the rail members, conductor elements 50 and 51 are provided between each of the bifurcated leg portions. The conductors may take the form of elongated strands or thin foils which may be placed with the rails during the extrusion of the frame sections. The conductors are protected from being inadvertently contacted by the bifurcated leg portions which extend outwardly therefrom.

The construction of the frame sections discussed above has been directed to the embodiment of the invention shown in FIG. 5 wherein forward and rearwardly oriented panel members are selectively retained in spaced relationship with respect to one another by the frame elements. In those embodiments where only a single panel, picture or screen member 25 is to be retained within the frame at any given time, it would be possible to utilize framing sections having only the outer flange element 35 and cooperating flange element 39 together with the spaced rail members 43 and 44. Also, in embodiments of the invention wherein each panel, picture or screen member includes scenes or other indicia on each side thereof thereby permitting the panels to be reversed for use in creating differing displays, a pair of grooves 31 may be provided along the peripheral edges thereof for selective engagement with the inwardly tapering end portions 37 and 38 of the outer flange elements 35 and 36. Also, although each of the frame sections has been described having component mounting rails extending along the entire length thereof, it is possible that only a single one of the top, bottom or side frame members may be provided with the mounting rails or that only one section will have electrical contact capability. The purpose of the rail members is to support various components which will be housed within the frame during use.

The optical fibers 28 have their fixed ends 52 gathered into a fiber optic matrix bundle 53 defined by an outer housing 54. The ends 52 of each of the optical fibers are aligned against one side of a glass end panel 56 which is used for heat dissipation when the fiber optic matrix bundles are oriented in spaced relationship with a light source as will be described in greater detail hereinafter.

Each of the fiber optic matrix bundles 53 is formed into a fiber optic component 57 which may be selectively secured within the spaced rail members of the frame elements. The fiber optic components 57 will include an elongated body portion having the fiber optic matrix bundle mounted to the uppermost portion thereof. The lower portion of the body includes a pair of spaced mounting legs 59 and 60 which may be reinforced by an intermediate web (not shown). The lowermost portion of each leg 59 and 60 includes a generally cylindrical base or foot portion 62 which is frictionally and slidingly received within the elongated openings or channels formed between the bifurcated leg portions 46 and 47 of the rails. In this manner, the fiber optic component 57 may be selectively snap fitted into sliding engagement with the rails and thereby be movably adjustable along the length of the rails. As the cylindrical foot portion 62 is complementary in diameter with respect to the elongated openings formed in each of the rails, the components may be slidingly positioned along the rails and yet be securely retained in an adjusted position by frictional forces developed by the rails being compressed against the base portions 62. It is envisioned that each kit of the present invention may include one, two or more fiber optic bundles from which a plurality of optical fibers such as acrylic fibers will be extended.

Figure 6:
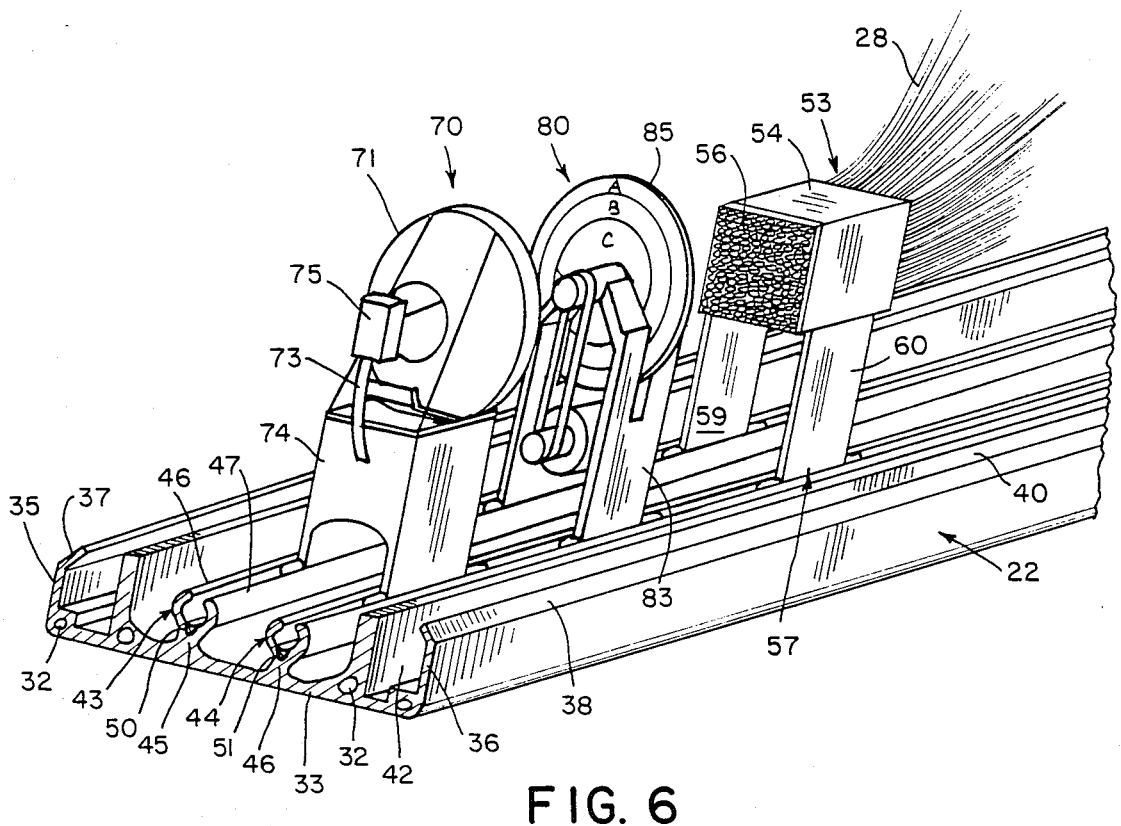
FIG. 6 is an enlarged partial perspective view showing the mounting frame assembly of the present invention having a light module, color and/or masking wheel module and fiber optic module mounted for sliding movement therein.

With particular reference to FIGS. 6 and 9, the light sources for the present invention or shown in detail. The adjustable lighting components 70 include lamp portions having a reflective element 71 in which a suitable bulb 72 is selectively received. Power to the bulb is provided by an electrical lead 73 which extends from the base portion 74 of the light component to a rear contact element generally shown at 75. The base portion of each light source or component includes a pair of bifurcated leg elements 76 and 77 having lower elongated mounting base portions 78 which are formed, at least partially, of electrically conductive material. As previously discussed, current conductors are provided along the inner portion of each of the mounting rails 43 and 44. When the base portions 78 and 79 of the light components are inserted within the pair of spaced rails, the conductive material will contact the electrical conductors 50 and 51 thereby creating a current contact to provide electrical energy to power the light bulb mounted within the lamp portion of the light component.

In view of the foregoing, the lamp components may be adjustably positioned along the rail elements 43 and 44 and yet maintain electrical contact with the source of electrical energy which will be described in greater detail hereinafter. This mounting permits the light source to be adjustably spaced with respect to the fixed end of the optical fibers which are secured to the fiber optic bundles of the fiber optic components.

As discussed above with respect to the separate fiber optic components, it is possible that one or more light sources may be provided with each kit depending upon the contemplated use of the kit.

The educational kits of the present invention also include one or more color wheel or light masking components generally designated at 80. Each of the color wheels will include a mounting portion 81 having bifurcated leg elements 82 and 83 having elongated base members 84 which are selectively receivable within the rails 43 and 44 so as to permit the components to be slidingly engaged and secured within each of the rail members as discussed above with respect to the light components and the fiber optic components. The color wheel or light masking components will also include a color or masking wheel 85 having a plurality of separate color filters or light masking sections incorporated therewith. The color wheel 85 is mounted on a shaft 86 which is connected by belt 87 to a motor 88 which receives power by way of electrical conductors (not shown) which extend downwardly to the mounting portions 84. As the mounting portions are also electrically conductive, they will make contact with the electrical conductors 50 and 51 provided in each of the rails 43 and 44. In the embodiment shown, the color and masking wheel 85 includes sections A and C which include a plurality of separate color frames while section B includes masking frames having differing degrees of light screening characteristics. As opposed to using combination color and masking wheels, or in addition thereto, it is possible that separate color and light masking wheels may also be utilized. The light masking wheels would provide areas of opaque and translucent materials to alter the intensity of the light being emitted from each of the light sources relative to the fiber optic components while the color wheels would vary the color patterns.

The kit of the present invention is designed to be powered utilizing either DC battery power or may be selectively utilized with an AC power outlet source by either providing an electrical cord 90 which extends from its inner end from a transformer 91 to an outer plug element 92 which may be selectively inserted into an appropriate household outlet or more safely by using an AC-DC converter in place of plug element 92. When the unit is to be utilized using a battery source, a separate battery module 95 is provided which includes an elongated cylindrical housing 96 which is open along the bottom side thereof and from which a pair of elongated depending leg portions 97 and 98 extend. The bases 99 and 99' of the leg portions are formed as elongated cylinders having generally circular cross sections so as to permit the battery module to be selectively inserted within the rail members 43 and 44. The batteries B which are housed within the module are electrically connected with the positive poles being electrically connected through contact 100 with conductive base or foot portions 99 and the negative poles in contact with base portion 99'. In this manner, the battery module may be selectively moved into various adjusted positions within the frame and yet provide a DC source of electricity directly to the conductors 50 and 51 in the rails to power the light source and motors used with the color or masking wheels. To control the on-off operation of the electrical sources, either AC or DC, appropriate membrane touch switches 120 may be provided along a portion of one of the frame sections. The switch would be electrically connected to the conductors 50 and 51 to properly shunt power thereto when the switches are in an off mode.

As previously discussed, the fiber optic kit of the present invention provides a plurality of developmental and instructional characteristics which may be utilized in addition to the artistic displays which can be created. With specific reference to FIG. 3 of the drawings, one embodiment of the present invention is shown wherein the picture, matrix or panel member 125 is provided with a plurality of openings 126 which are oriented in a predesignated manner with respect to one another so as to define the outline of a specific object or art form. Each of the optical fibers 28 likewise includes a numbered tag 27 which specifically identifies the fiber. In the use of this embodiment of the invention, instructions are provided indicating that specific numbered optical fibers should be inserted through identified numbered openings in the display panel. By properly inserting each of the optical fibers in the predesignated and numbered openings, the proper object is created. Thereafter, the panel member 125 may be inserted within the frame member with the fiber optic module 57 being likewise inserted in the channels 43 and 44 of one of the frame sections. As opposed to using tags to indicate which of the optical fibers 28 is to be inserted within each of the respective openings 126, the optical fibers may include colored markings which would indicate their proper placement with respect to the numbered openings in the panel member 125. The instructions would include information indicating that the color red, for instance, would be inserted in numbers 3, 4, 10, 11, 20 and 22, respectively, while colored blue fibers would be inserted in openings 1, 2, 15 and 16 and so on. In this manner, varied instructions matching numbers and colors could be utilized to teach children how to recognize colors and numbers and to follow instructions to obtain a predetermined pictorial displays.

As opposed to utilizing a predetermined or predesignated display, the invention may also include matrix displays or panels such as shown at 200 in FIG. 2 which have a plurality of openings 226 generally uniformly spaced therein. The openings would not be designated with any numbers or other indicia but would allow the selective placement of the optical fibers 28 through any of the openings. In this manner, an individual could create their own design or display such as shown by the lighting of specific points 227 to form the shape of a Christmas tree 228. The front of the panel could thereafter be colored to show the shape of the Christmas tree with the tips 27 of the optical fibers forming the lights on the tree. In this manner, the invention may be utilized to allow expression of individually created highlighted art forms.

With specific reference to FIG. 4, another instructional use of the present invention is disclosed in greater detail. In FIG. 4, the display or panel member designated as 300 includes an outline of a geographical area such as the United States 301. With this embodiment, children would be instructed to place predesignated optical fibers coded with the names of state capitals in the proper state openings 326 which designate the capitals of the various states such as indicated at 327. If instructions are properly followed, the display could be animated utilizing a rotating color or masking wheel so that either a sequence of color or a sequential movement of light would occur from one coast to the other of the map with the various tip portions 27 of the optical fibers 28 being lighted in proper sequence as predetermined by the placement of the optical fibers within an optical fiber bundle. In this manner, an immediate visual indication that the proper optical fibers were placed within the proper openings designating the state capitals. The lighting of a state capital along the east coast at the time one was lit along the west coast would indicate that instructions were not properly followed and that various optical fibers were not placed in the proper openings.

From the foregoing, it can be seen that various types of educational and artistic displays may be created utilizing the teachings of the present invention. The fiber optic bundle component, light source components and color wheel and masking component combinations may be easily and selectively mounted within the mounting frame with proper positioning being maintained of the components relative to one another so as to create an illuminated picture or picture form which may be appropriately displayed by being mounted upon a wall or other surface for later viewing.

We claim:

1. A fiber optic display kit comprising a frame means, a panel means carried by said frame means, a plurality of optical fibers mounted to said frame means, each of said optical fibers having first and second end portions, a light source means mounted to said frame means adjacent said first end of said plurality of optical fibers, a plurality of openings in said panel means, said second end of each of said optical fibers being selectively insertable through said openings in said panel means, energy source means for supplying electrical power to illuminate said light source means, at least one color wheel means mounted to said frame means intermediate said light source means and said first end of said optical fibers, means connecting said color wheel to said energy source means, said energy source means including a battery module means, said battery module means being supported by said frame means, whereby said second ends of said optical fibers may be positioned through said openings in said panel means to create a lighted display with respect thereto.

2. A fiber optic display kit comprising a frame means, a panel means carried by said frame means, a plurality of optical fibers mounted to said frame means, each of said optical fibers having first and second end portions, a light source means mounted to said frame means adjacent said first end of said plurality of optical fibers, a plurality of openings in said panel means, said second end of each of said optical fibers being selectively insertable through said openings in said panel means, energy source means for supplying electrical power to illuminate said light source means, at least one color wheel means mounted to said frame means intermediate said light source means and said first end of said optical fibers, means connecting said color wheel to said energy source means, said first end of said optical fibers being bound together to form a fiber optic bundle which is secured within a housing, said housing having leg portion extending therefrom, said leg portions being selectively engageable with said frame means so that said fiber optic bundle is selectively movable with respect to said frame means, whereby said second ends of said optical fibers may be positioned through said openings in said panel means to create a lighted display with respect thereto.

3. The fiber optic display kit of claim 2 in which said frame means includes a plurality of sections which are engageable with one another, at least one of said sections of said frame means having elongated mounting portions formed therein, each of said fiber optic bundle, said light source means and said color wheel means being movably supported by said elongated mounting portions so as to be adjustable relative to one another and said panel means.

4. The fiber optic display kit of claim 3 in which said elongated support means includes a pair of elongated mounting rails which extend along the length of said one of said sections, and electrical conductor means disposed along each of said rail means.

5. The fiber optic display kit of claim 4 in which each of said rail means includes bifurcated leg portions which define an elongated opening therebetween, said conductor means being positioned inwardly of said opening between said bifurcated leg portions, each of said light source means, said color wheel means and said fiber optic bundle having base portions which are slideably engaged within said rail means, each of said base portions of said light source means and said color wheel means being electrically conductive so as to receive energy from said conductor means within said rail means.

6. The fiber optic display kit of claim 5 in which said sections of said frame means include at least a first pair of spaced elongated flange members, an elongated groove formed between said spaced elongated flange members, said panel means being selectively receivable in said channel.

7. The fiber optic display kit of claim 6 in which said first flange means includes an inwardly oriented outer end portion for urging said panel means towards said second flange member.

8. The fiber optic display kit of claim 7 including at least first and second pairs of said first and second flange members extending along substantially the entire length of each of said sections of said frame means.

9. A fiber optic display kit comprising a frame means, said frame means including a plurality of sections which are interfitted with respect to one another, each of said sections having a first pair of spaced elongated flanges defining a slotted opening therebetween, a panel means slideably receivable in said slotted opening of said frame means, at least one of said sections of said frame means having a pair of elongated rail members extending along substantially the entire length thereof, electrical conductor means associated with each of said rail members, a fiber optic module means, said fiber optic module means including a plurality of optical fibers having fixed ends mounted thereto and free ends extending therefrom, said selectively engageable with said rail members so that said fiber optic bundle may be movably mounted with respect to said rail members, a light source means, said light source means having a base portion which is selectively engageable with said rail members so as to be slideable with respect thereto, said base portion of said light source means having contact means for engaging said conductor means within said rail members, a color wheel means, said color wheel means including a rotatable color wheel disposed between said light source means and said fixed ends of said optical fibers and having a base portion engageable with said rail members so that said color wheel means may be slideably oriented with respect to said rail members, electrical energy source means connected to said at least one of said sections of said frame means for supplying power to said conductor means within said rail members, said panel means having a plurality of openings therein, said free ends of said optical fibers being selectively oriented through said openings in said panel means whereby said optical fibers may be utilized to highlight said panel means.

10. The fiber optic display kit of claim 9 in which said electrical energy source includes a battery pack assembly, said battery pack assembly including a housing having a pair of depending leg portions, said leg portions being mounted within said rail members so as to be in electrical contact with said conductor means, whereby energy from batteries carried within said housing may be transmitted to said conductor means within said rail means.

11. The fiber optic display kit of claim 9 in which each of said sections of said frame include a second pair of spaced elongated flange elements defining a second elongated opening therebetween, and second panel means movably receivable within said second elongated opening of said sections of said frame means.

12. The fiber optic display kit of claim 11 including designation means adjacent each of said openings in said second panel means, and second designation means attached to said optical fibers whereby said optical fibers may be designated to be placed through selected openings in said second panel means.

* * * * *